Sept. 23, 1947.  E. H. ROSE  2,427,924
INTERNAL SCREW THREAD AND DIAMETER GAUGE
Filed Jan. 5, 1944  2 Sheets-Sheet 1
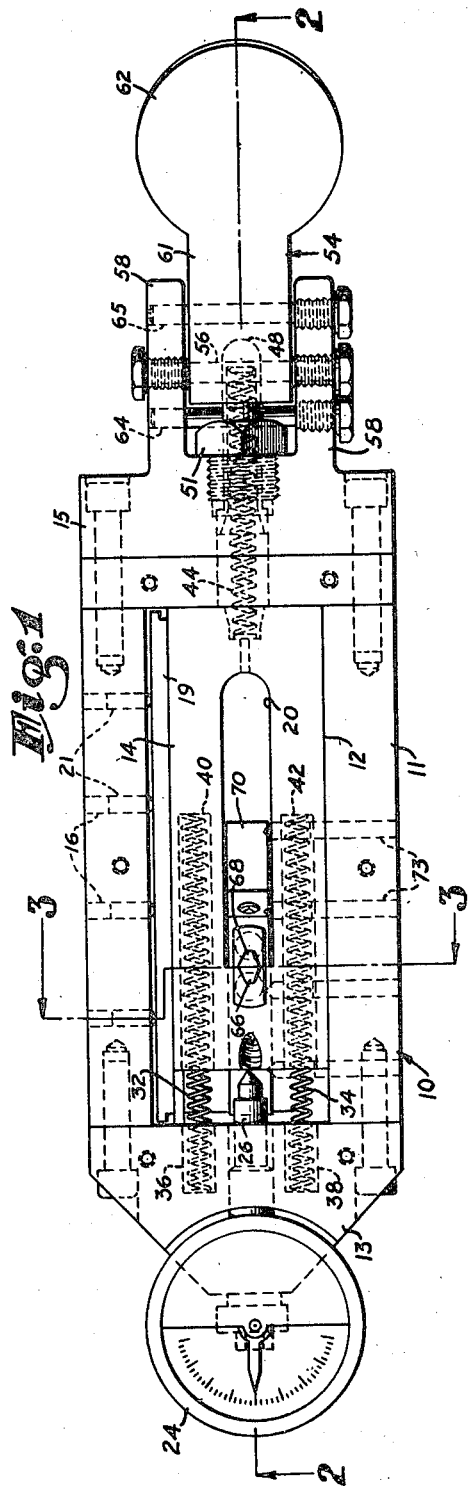
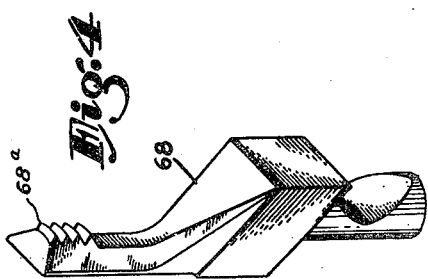
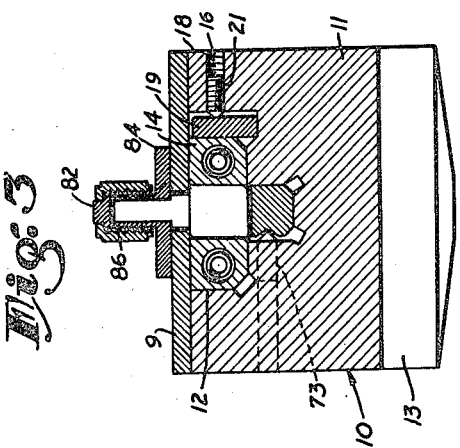
INVENTOR.
EDWARD H. ROSE
BY Edwin Coates
ATTORNEY

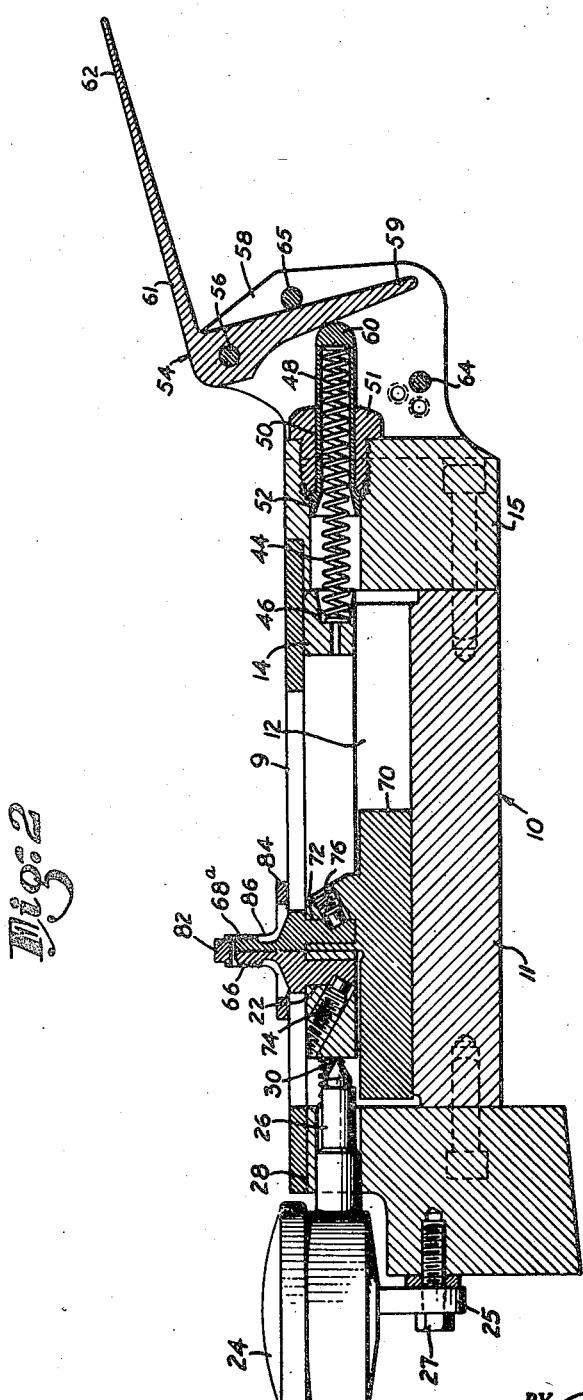

Patented Sept. 23, 1947

2,427,924

UNITED STATES PATENT OFFICE 2,427,924

INTERNAL SCREW THREAD AND
DIAMETER GAUGE

Edward H. Rose, Santa Monica, Calif., assignor
to Douglas Aircraft Company, Inc., Santa
Monica, Calif.

Application January 5, 1944, Serial No. 517,284

6 Claims. (Cl. 33—199)

This invention relates to gauges and specifically to a gauge intended to be used to check the interior threads of nuts though it is not necessarily restricted to such use. The tolerances permitted on threads and circularity of bore are usually of the order of two to five one thousandths of an inch.

The general practice at present is to use "go, no go" gauges for gauging nut threads. Gauges of the kind referred to usually comprise short lengths of hexagonal bar of diameters suitable to the specific size of nut to be tested, provided with a perfectly formed thread at each end, one thread being very slightly oversize and the other very slightly undersize, the sizes of the threads together defining the tolerance allowable. The piece of bar is clamped in a vise and the operator first screws the nuts on the larger diameter thread. If the nut will go on the thread of larger diameter, even though not easily, but will go snugly on the smaller diameter thread, the nut is passed as satisfactory if it is tight on the larger thread but will go on the smaller thread, it is still passed as satisfactory. If the nut will not go on the larger thread, the nut is rejected.

The shortcomings of such a method of inspection are many.

The nut may not thread onto the gauge because of some small imperfection of the first turn of the thread which, if overcome by tightening the nut on a bolt with a wrench, would be of no consequence, the rest of the thread being satisfactory. Or the nut might be slightly distorted and tightening it on a bolt with a wrench might bring it into perfect shape.

The mere hand forcing of nuts that are somewhat tight on the gauge wears the gauge, which must be checked at regular intervals. If such checking is overlooked, numbers of oversize nuts could be passed as satisfactory. This might result in serious trouble, since such a nut would engage the mating threads toward the tip of the tooth form and could result in stripping off.

On the other hand, a nut might screw on the gauge satisfactorily, but might actually be defective because of elliptical bore which in use would throw the load on a part of the thread only and might easily result in stripping the threads. Further, the hand manipulation of the nuts results in low output and is fatiguing to the operator.

To improve the operation of gauging nuts, various types of gauge have been proposed depending on the use of movable jaws engaging against the interior of the threaded bore of the nut, and the invention relates to an improved gauge of this type.

The object of the invention is to provide a gauge having means for positively positioning the test part in the proper position for gauging yet enabling the test part to be rotated to enable different portions thereof to be checked.

A further object of the invention is to provide a thread gauge having means for accurately yet rotatably supporting a threaded member such as a nut in position, so that a selected zone of the threads may be checked, said means enabling the nut to be rotated to check for trueness of the nut bore.

A still further object of the invention is to provide an interior thread gauge having gauging members adapted to make contact by a movement toward and from the thread of the test part, thus avoiding wear due to frictional movement between the gauging members and test piece, yet permitting rotation of the test piece to ensure that the gauging members clear dirt from the thread.

Yet another feature of the invention is to provide a thread gauge comprising a test piece positioning arrangement enabling a variety of test pieces to be supported in proper position.

A still further object of the invention is to provide a thread gauge having gauging members provided with thread elements formed to mesh with the threads on the test piece so that the helix angle of the threads on said member can be checked, said gauging members being readily changed to gauge test pieces having different thread characteristics.

Another object of the invention is to provide a gauge of rugged construction and long life yet sufficiently sensitive for the work for which it is intended, this result being achieved by providing actuating forces large in view of the resistance encountered by the moving parts of the instrument.

Still another object of the invention is to provide a gauge of rugged construction but having very low values of resistance, this object being achieved by reducing the bearing surfaces of movable parts in contact.

A still further object of the invention is to provide a gauge comprising a minimum of moving parts means being provided to enable the moving parts to be kept in proper adjustment.

Still further objects and features of the invention may hereinafter appear in the following description and/or accompanying drawings in which a preferred embodiment of the invention is shown.

by way of an illustrative example, but it is to be understood that the scope of the invention is not limited by this illustrative embodiment but only as defined by the appended claims.

In the drawings, in which identical numbers indicate identical parts,

Figure 1 is a plan view of the gauge with cover plate removed.

Figure 2 is a side elevation in cross section on the line 2—2 of Figure 1, with some parts left in elevation for clearness.

Figure 3 is an enlarged cross sectional view on the line 3—3 of Figure 1.

Figure 4 is a view in cavalier projection to an enlarged scale of one of the test piece engaging elements.

Referring to Figures 1 and 2, the numeral 10 indicates the body or housing which may be formed in any suitable manner, but, in the form of the invention illustrated, is built up from a body block 11 and end blocks 13 and 15. The joining faces of these parts are carefully finished to afford a solid structure held together by dowel pins and capscrews.

A cover plate 8 is arranged to completely cover the top of the built up gauge body and is secured in position by machine screws engaging in tapped bores in the end blocks and in the sides of the body block 11.

The body or housing 10 is provided with a slot 12, T-shaped in cross section, in the upper wider portion of which a slide 14 is arranged. The recess is of a length sufficient to permit longitudinal movement of the slide but is fitted to hold the slide against lateral movement by a rubbing strip 19 also mounted in the recess and adjusted toward slide 14 by set screws 21 in bores 16 in the side wall 18 of the wider part of the recess.

A vertical slot 20 is formed in slide 14 to extend lengthwise thereof and a pin or jaw socket 22 is formed toward the forward end of the slide.

A dial indicator 24 is mounted on the forward end of the gauge body by a lug 25 projecting from the back thereof and a machine screw 27 passing through a hole in said lug and screwed into a tapped bore in the end piece. The screw 27 acts to clamp the lug 25 between the end surface of end piece 13 and the head of the screw. The stem 26 of the indicator projects through a bore in end piece 13 into the upper portion of the slot 12 in the gauge body, with the point 30 of the dial indicator stem contacting the forward end of the slide 14.

The slide is normally held toward end piece 15 by springs 32 and 34 seated at one end in bores 36 and 38 in the end piece 13 and extending at the other end into bores 40 and 42 which extend longitudinally into the slide 14. Slide 14 can be moved forward against the resistance of springs 32 and 34 by a spring 44 which is stiffer than combined springs 32 and 34 but which is not highly stressed except when the gauge is being operated. Spring 44 is positioned with one end in a recess 46 in the rear end of slide 14 and with the other end in a tubular member 48 having its outer end closed and projecting through the bore 50 of a sleeve nut 51 fitted in a bore in the rear wall of the gauge body. The tubular member 48 is prevented from passing outwardly completely through the bore 50 by a collar 52 projecting radially from the periphery of the inward end of the tubular member.

Spring 44 is adapted to be stressed by a bell crank lever 54 pivoted at 56 in lugs 58 extending from the rear end of the end piece 15. One arm 59 of the bell crank lever 54 bears against the closed end 60 of the tubular member 48, which is rounded to secure a substantially axial thrust by lever arm 59 on tubular member 48, and the other arm 61 of the lever 54 is arranged to extend horizontally to the rear of the gauge body, preferably being fitted with a plate 62 at the free end to facilitate manipulation by the operator.

The operative movement of lever 54 is limited by a stop 64 formed as a projecting stud which may be screwed selectively into any one of a group of tapped holes so that the amount of stress imparted to spring 44 may be adjusted if necessary, and preferably a stop 65 is arranged to limit the movement of lever arm 54 in the "off" position.

The gauge members contacting the test piece comprise two pins or jaws 66 and 68, one of which (66) is mounted in the socket 22. The second pin 68 is mounted in a bar or base member 70 positioned in the lower narrow channel of the T-shaped slot 12 and provided with a socket 72 to receive the pin, which projects through the slot 20 in slide 14 to substantially the height of pin 66 above the face of the gauge. The base member 70 is held immovable in the slot by set screws 73, this arrangement permitting adjustment of base member 70 if required.

By reference to Figure 3, it will be seen that the lower longitudinal corners of the upper and lower portions of the slot 12 in the gauge body and of the slide 14 and base block 70 are cut away to facilitate machining the contacting surfaces to smoothness, and since the gauge is kept lubricated and the positive forces acting on the test pins or jaws 66, 68 are considerable, the deleterious effects of friction in the gauge are negligible.

Both pins or jaws 66 and 68 are retained in their sockets by set screws 74 and 76 respectively and thus may be readily changed to gauge test pieces having various types of thread or if for any reason the thread elements on the operative faces of the pins become defective.

It is preferable to cut thread engaging elements 68a in the pins which have a form such as to function satisfactorily with test pieces of different diameters. In Figure 4 I show a form of the tooth cut in the pins which has given satisfactory service in gauging nuts of from a half inch to two inches in diameter.

As the helix angle of the threads becomes smaller as the nut size increases, it is necessary to make the helical length of the crest of the thread element short and while the crest might be formed as a point, a length of about $\frac{1}{32}$ inch has been found satisfactory in use.

The pins 66 and 68 are normally held together by springs 32, 34, urging the pin 66 on the movable slide 14 against the pin 68 mounted in the bar 70 held in the gauge body.

The test piece shown in the drawings represents a type of nut used in hydraulic lines, and is representative of many different forms of nuts such as union, coupling, sleeve, pipe flange, or reducer bushings, which are furnished with an interior thread and an annular inwardly projecting flange at one end.

To support such nuts in the desired position for testing, positioning means 82 is provided. The positioning means shown comprises a washer-like base member 84 and a vertical stem 86 which is turned down toward its upper end to provide an annular abutment which engages against the flange on the nut to be tested and supports the nut at the proper height. A slot is formed through the vertical stem 86 and base 84 to permit the positioning means to be placed in position over the pins 66 and 68, the base 84 resting on the cover plate 9, a plurality of such positioning members being provided to enable nuts of different sizes and lengths to be tested. The positioning member is free to slide laterally so that it cannot restrict the functioning of the gauge.

The positioning means hold the test nuts securely at the proper height yet permit the nut to be freely turned about its vertical axis to allow different points of the interior thread to be tested, as will be later described.

While I find the described construction of positioning means very convenient to use I do not limit myself thereto. For instance, the stem 86 might be sectional in construction, an upper portion being interchangeable with elements of different height and diameter so that one positioning means could properly position a variety of sizes and types of nuts or cylindrical members.

It might be here pointed out that if the gauge is to be used for testing some bearing sleeves or nuts having no internally projecting annular flange, the base member can be built up to support the test piece at the desired height or heights by washers of known thickness.

A simple rearrangement of parts could be carried out to test the outer surface of cylinders or exterior threads, the lever 54 being operated to separate the test pins or jaws and springs 32, 34 acting to bring the jaws against the test piece.

In operating the device the inspector drops a nut on to the positioning means (it being understood that these means have been selected as proper for the size of nut to be tested). The nut will then be supported at a height such that threads spaced from the ends will be engaged by the pins or jaws 66 and 68. The operator then operates the lever arm 60 by bearing down on the plate 62, holding the lever arm 54 against the stop 64 and turning the nut slightly back and forth to make certain that the jaws are fully engaged in the threads. Full engagement will be indicated by a sudden jump of the indicator to a stable reading. The pressure of spring 44 due to the force exerted by arm 59 will move the slide 14 to separate pin 66 from fixed pin 68 until stopped by engagement with the interior thread of the nut, when the thread elements on both pins 66, 68, will be seated in the interior thread of the nut at diametrically opposite points.

The indicator hand of the dial gauge, which has been previously set to zero for one limit of the allowable tolerance by measuring a standard nut on the gauge, will either remain at zero or show a variation on the allowable side, or beyond the allowable limit. In the latter case the nut would be rejected.

The operator next releases the pressure on the lever 54, which results in the test jaws being freed from the test piece, rotates the nut through a quarter turn, and again operates lever 54 as before. The second reading should be the same as before if the bore is truly circular. If the reading of the dial indicator is materially different, the bore is shown to be not circular and the nut will be rejected.

A further test which may be made with advantage at intervals in each batch of nuts or other parts, is to determine that the bore is of the same diameter from end to end of the bore. This can be readily done by rotating the nut so that it is screwed off the test jaws while watching the reading of the dial indicator.

The gauging or inspection operation employing the gauge of my invention is effected in a matter of seconds as against minutes taken by the usual inspection procedure and the expenditure of energy necessary is very small. Further, since the only wear on the gauge pins or jaws is that due to the slight rotary movement effected to insure proper seating of the jaws, the wear is of practically negligible proportions.

It is believed that the inspection gauge of the invention provides a valuable advance in the art since it greatly speeds up and improves the vital procedure of precision inspection while eliminating muscular fatigue of the operators.

I claim:

1. A gauge comprising: a gauge body formed to provide a guideway; a slotted side arranged in said guideway for reciprocatory movement therein; a member arranged to extend between a side of said slide and the side of said guideway, and means for adjusting the position of said member to eliminate side play in said slide; a test piece engaging jaw carried by said slide; a stationary test piece engaging jaw mounted in said gauge body below said slide and projecting through the slot therein in operative relation to the jaw carried by said slide; means for detachably securing said jaws in the gauge body and slide respectively; a test piece supporting part acting to definitely but rotatably position a test piece relatively to said test piece engaging elements; means for moving said slide to cause the test piece engaging elements to bear against the test piece; and indicator means to show the amount of movement of said slide.

2. A gauge comprising: a gauge base; a guideway formed in said base; a slide arranged for to and fro movement in said guideway; a stationary test piece engaging element carried by said base; a second test piece engaging element carried by said slide and adapted to cooperate with said first test piece engaging element; means supported by said base for pendantly supporting a test piece in a predetermined position relative to said elements, said supporting means being removable for substitution with similar but different sized supporting means; means for moving said slide to cause the test piece engaging elements to bear against the test piece; and indicator means to show the amount of movement of said slide.

3. A gauge comprising: a gauge body; a stationary but detachable test piece engaging element mounted in said body; a slide carried in said body for reciprocatory movement and a second detachable test piece engaging element carried by said slide and adapted to cooperate with said first test piece engaging element, said jaws being formed with serrations on their operative faces formed as short portions of one turn of a thread mating with the thread on the test piece; means circumscribing said elements for pendantly supporting a test piece in a predetermined position relative to the serrations of said elements, said supporting means being formed with openings through which the serrations of said elements project; means for moving said slide to cause the test piece engaging elements to bear against the test piece; and indicator means to show the amount of movement of said slide.

4. A gauge comprising: a gauge body; a stationary test piece engaging element mounted in said body; a slide carried in said body for reciprocatory movement and a second test piece engaging element carried by said slide and adapted to cooperate with said first test piece engaging element; a test piece supporting part acting to definitely but rotatably position a test piece relatively to said test piece engaging elements; a lever for moving said slide; resilient means transmitting the movement of said lever to said slide; stop means to limit the operating movement of said lever; and indicator means to show the amount of movement of said slide.

5. A gauge comprising: a gauge body; a stationary pin mounted in said body and funished with serrations on an operative face; a slide carried in said body for reciprocatory movement; a pin furnished with serrations on an operative face and carried by said slide; a test piece positioning part acting to definitely position said test piece rotatably in position relatively to said pins; resilient means for moving said slide to normally hold the pin carried by said slide out of operative position relatively to the pin supported by the gauge body; further resilient means adapted to be operated to act in opposition to said first resilient means; and means for applying force to said further resilient means to overcome the resistance of the first mentioned resilient means to cause the pin carried by the slide and said pin supported by the gauge body to bear against opposite sides of the test piece; and indicator means to show the amount of movement of said slide.

6. A gauge comprising: a gauge body; a slotted slide carried in said body for reciprocatory movement; a pin carried by said slide; a stationary pin mounted in said body and projecting through the slot in said slide into operative relation to said first pin; a test piece positioning part acting to definitely but rotatably position the test piece in position relatively to said pins; resilient means for moving said slide to normally hold the pin carried by said slide out of operative position relatively to the pin supported by the gauge body; means for moving said slide to cause the pin carried thereby to bear against the test piece; and indicator means to show the amount of movement of said slide and therefore of the pin carried thereby.

EDWARD H. ROSE.

REFERENCES CITED

The following references are of record in the file of this patent:

UNITED STATES PATENTS

| Number | Name | Date |
|---|---|---|
| 1,625,462 | Frauenthal | Apr. 19, 1927 |
| 2,216,795 | Aller | Oct. 8, 1940 |
| 1,630,690 | Bosle et al. | May 31, 1927 |

FOREIGN PATENTS

| Number | Country | Date |
|---|---|---|
| 34,728 | France | Sept. 11, 1929 |
| 422,675 | Germany | Dec. 5, 1925 |